United States Patent [19]
Janich

[11] 4,278,236
[45] Jul. 14, 1981

[54] SLIDE VALVE FOR PIPELINES

[76] Inventor: Hans-Jurgen Janich, Regelkamp 12, 4720 Beckum, Fed. Rep. of Germany

[21] Appl. No.: 18,622

[22] Filed: Mar. 8, 1979

[30] Foreign Application Priority Data

Mar. 30, 1978 [DE] Fed. Rep. of Germany ....... 2813655

[51] Int. Cl.³ .............................................. F16K 25/00
[52] U.S. Cl. .................................... 251/159; 251/174; 92/44
[58] Field of Search ...................... 251/159, 174; 92/44

[56] References Cited

U.S. PATENT DOCUMENTS

| 3,130,963 | 4/1964 | Stegner | 92/44 X |
| 3,266,525 | 8/1966 | Wolter | 251/159 X |
| 3,741,522 | 6/1973 | Frohlich | 251/159 |

FOREIGN PATENT DOCUMENTS 562721  5/1958  Belgium ................................... 251/159

Primary Examiner—Harold W. Weakley
Attorney, Agent, or Firm—Marshall & Yeasting

[57] ABSTRACT

A valve housing is adapted to be built into a pipeline, and a valve plate is movable into a valve-closing position in the housing. A displaceable sealing member provides a seal between the valve plate and the housing. At least one spring tends to displace the member into sealing position, and at least one pressure-medium actuated bellows is arranged, upon receiving the pressure medium, to displace the member away from sealing position.

2 Claims, 5 Drawing Figures

SLIDE VALVE FOR PIPELINES

BACKGROUND OF THE INVENTION

This invention relates to a slide valve for pipelines, particularly hot-gas pipelines of large dimensions, comprising a valve housing intended to be built into the pipeline, a valve plate designed to be inserted into the valve housing and a seal provided between the valve plate and the valve housing, in which the sealing surfaces are displaceable relative to one another by at least one pressure-medium-operated bellows and at least one oppositely acting spring, for establishing and breaking a sealing contact.

In known slide valves of the type mentioned above, the arrangement is in every case such that, on receiving the pressure medium, the bellows (or compensator), seeks to establish sealing contact between the sealing surfaces, whilst the oppositely acting spring breaks the sealing contact when the supply of pressure medium to the bellows is interrupted.

An arrangement such as this is attended by significant disadvantages in cases where the slide valve is used for example in pipelines for transporting hot, dust-containing gases possibly laden with pollutants. This is because, in the event of a power failure affecting a slide valve of this type, the tensioned spring moves the sealing surfaces into a position in which the sealing contact is broken. The result of this is that hot gases can escape from the pipeline, which is a serious hazard, particularly in cases where the hot gases in question contain pollutants.

SUMMARY OF THE INVENTION

Accordingly, the object of the invention is to provide a slide valve of the type mentioned above which obviates this disadvantage and which, in addition, is distinguished by a simple, space-saving construction.

According to the invention, this object is achieved by arranging the spring and the pressure-medium-operated bellows in such a way that the tensioned spring acts to establish the sealing contact whilst the bellows, on receiving the pressure medium, acts to break the sealing contact.

That side of the bellows which is remote from the seal is best connected to the displaceable sealing surface, whilst that side of the bellows which faces the seal is best connected to an abutment. To this end, the arrangement adopted in accordance with the invention is preferably such that the two end faces of the bellows are respectively connected to a sealing part carrying the displaceable sealing surface and to the abutment through pull rods extending longitudinally of and closely surrounding the bellows.

In the slide valve according to the invention, the sealing contact between the sealing surfaces is established by spring force, and is broken by the bellows on receiving the pressure medium. This ensures that, in the event of a power failure, no hot gases can ever escape from the pipeline in the region of the slide valve.

In addition, the structural solution provided by the invention is distinguished by a very simple and space-saving construction, which is particularly advantageous in the case of a slide valve intended for pipelines of large dimensions.

It is best to provide several bellows-and-spring assemblies uniformly distributed around the periphery of the valve plate in order to obtain canting-free operation and a uniform sealing pressure over the entire periphery.

According to the invention, the bellows, the spring and the displaceable sealing surface connected to them may be carried either by the valve housing or by the valve plate. In the first case, a co-operating sealing surface is provided on the valve plate whilst, in the second case, it is provided on the valve housing.

In one particularly stable embodiment, the sealing part carrying the displaceable sealing surface is in the form of a sealing frame.

In order to establish a seal between the above-mentioned displaceable sealing part and an abutment integral with the housing, it is best to provide between these two components an elastically deformable sealing membrane made of a suitable sealing material.

In another advantageous embodiment of the invention, a second sealing membrane of a soft, elastic sealing material is provided between the outer periphery of the sealing frame and the inner periphery of the valve housing. An arrangement such as this is particularly advantageous in cases where the slide valve according to the invention is installed in a closed building. When, in this embodiment, the valve plate is shifted and the displaceable sealing part or rather the sealing frame with its sealing surface is in the open position, no gas is able to escape from the valve housing, by virtue of the presence of the second sealing membrane; in other words provision is made for a gas-tight housing. After the sealing position has been restored in the slide valve, the gas which has collected outside the actual pipe section can be run off through a suitably arranged pipe. In the case of a highly corrosive or otherwise highly active gas, this also prevents any operating elements of the slide valve from being damaged. This embodiment affords another significant advantage in that, in the event of a defect in the first sealing membrane provided between the displaceable sealing part and the abutment, no gas is able to pass over into the low pressure side of the slide valve or the pipeline itself, which in the course of repair work could cause serious injury (possibly even with fatal results) to the personnel involved.

In this embodiment of the slide valve, particular importance is also attached to the use of a soft, elastic sealing material for the second sealing membrane. This is because, in cases where the pipeline is used for transporting gases having a relatively high content of dust particles which may be moist and have a tendency towards crust formation, any crusts formed are peeled off by the movement of the displaceable sealing part or sealing frame as the result of the deformations occurring within the sealing membrane, so that the sealing membrane is always able to function effectively. The first sealing membrane arranged between the displaceable sealing part and the abutment integral with the housing may also be made in the same way and with the same advantages.

The slide valve according to the invention may have a uniform large internal cross-section corresponding to the rated cross-sectional area of the pipeline.

In many cases, however, it is preferred to provide a cross-section smaller than the rated cross-sectional area of the pipeline, in the region of the displaceable sealing element and the valve plate. To this end, the arrangement may be such that, as seen in the direction of gas flow, the reduced cross-section is preceded by the first sealing membrane tapering in cross-section, and is followed by a transition fitting which widens to the rated cross-sectional area of the pipeline. Accordingly, the narrowest cross-section is situated in the region of the sealing plane, which ensures that, when the displaceable sealing part is opened, only relatively small quantities of water of condensation or dust are able to enter the valve housing itself.

The principle according to the invention may be applied both to valve plates designed to travel rectilinearly between the closed position and the open position and to valve plates designed to pivot between the closed position and the open position.

Figure 1:
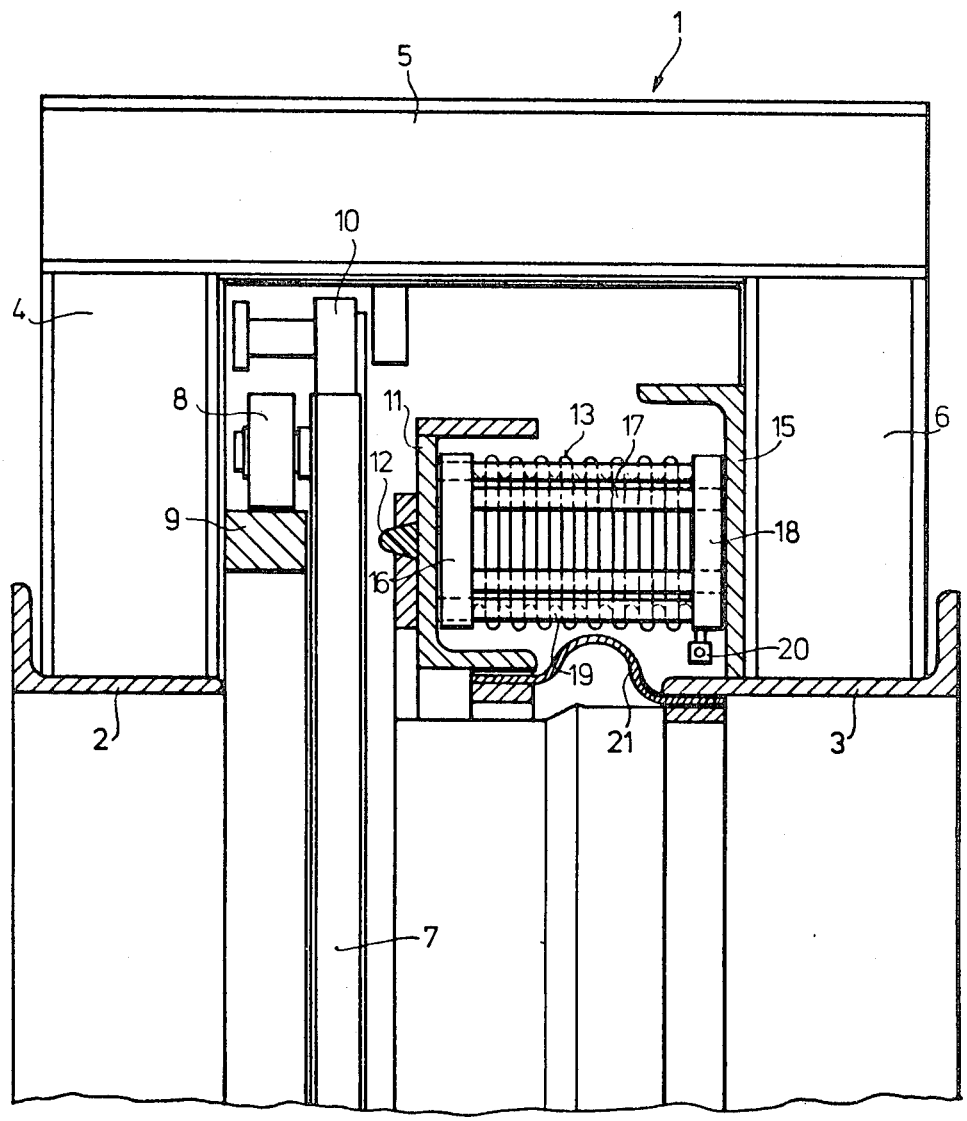
FIG. 1 is a cross-section through a slide valve according to the invention (in the region of a bellows with the sealing contact broken), with the valve plate in the closed position.
Figure 2:
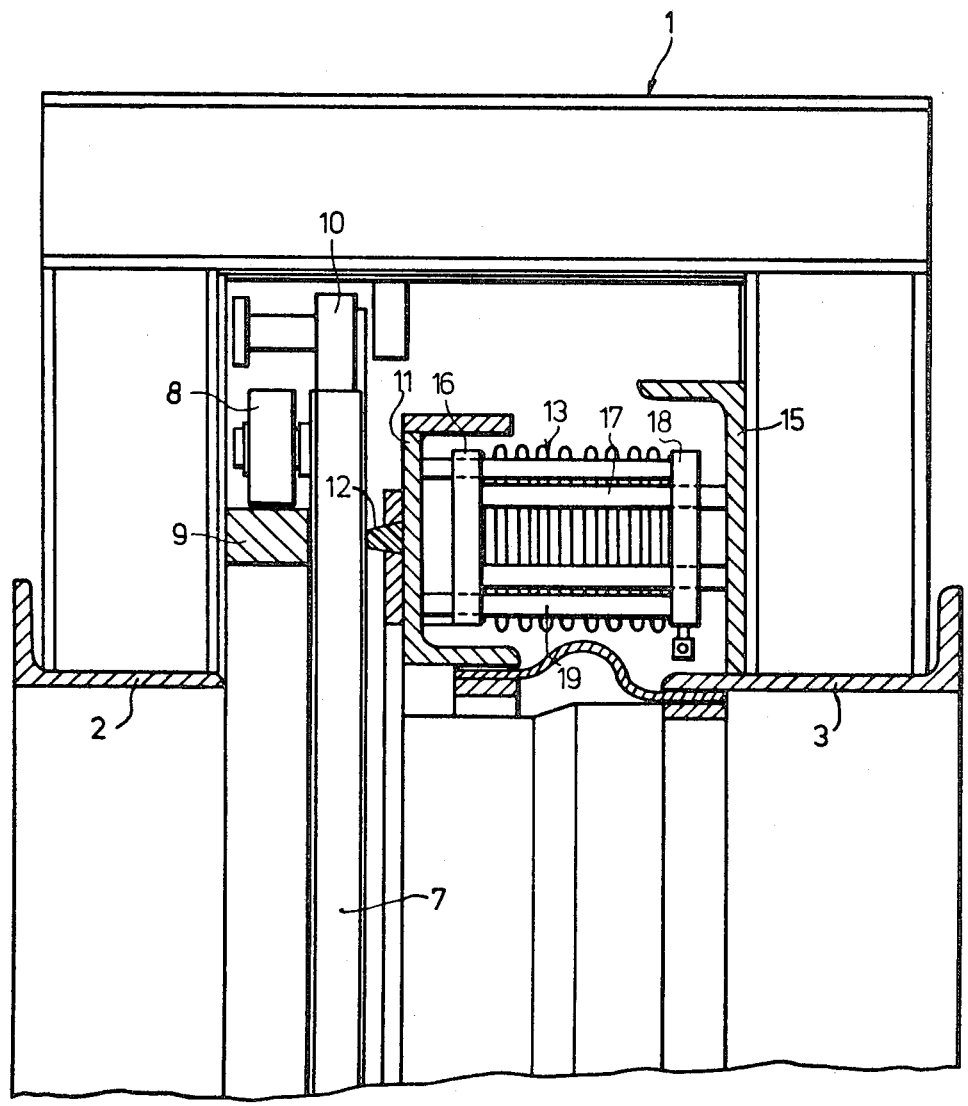
FIG. 2 is a section corresponding to FIG. 1 (with sealing contact established).
Figure 3:
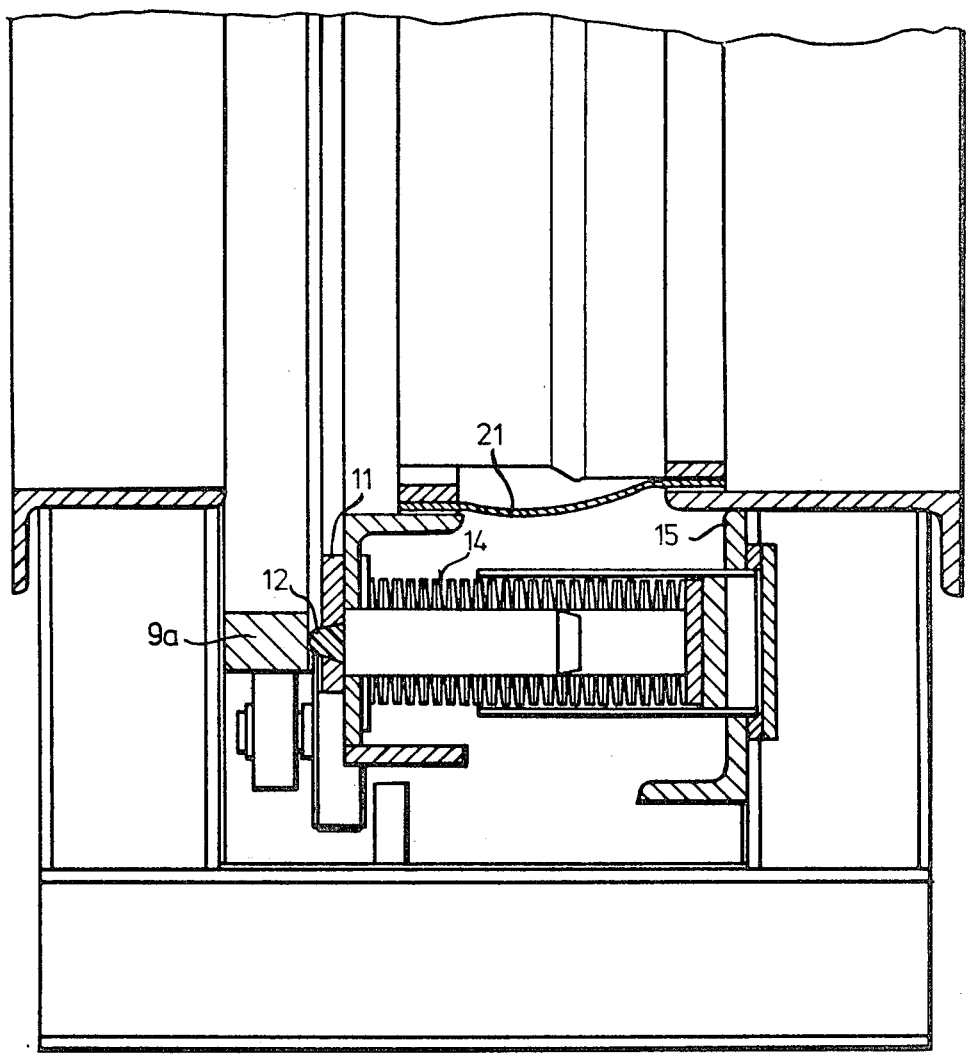
FIG. 3 is a section through the slide valve in the region of a spring assembly (with the valve plate in the open position).

The slide valve 1 illustrated in FIGS. 1 to 3, which is intended to be built into a hot gas pipeline, comprises a valve housing consisting essentially of pipe flanges 2, 3 and stays 4, 5 and 6 connecting them.

A valve plate 7 is designed to be moved into and out of the valve housing. In the embodiment illustrated, the valve plate 7 is arranged to travel horizontally on a rail 9 by means of rollers 8, being driven via a lantern wheel 10.

A displaceable sealing part 11 is provided in the valve housing. This displaceable sealing part 11 carries a sealing element 12 and is arranged facing the valve plate 7 near its periphery.

This displaceable sealing part 11 is under the control of, on the one hand, several bellows 13 uniformly distributed around the periphery and, on the other hand, of a number of spring assemblies 14 which are also uniformly distributed around the periphery.

The bellows 13 are arranged as follows between the displaceable sealing part 11 and an abutment 15 provided on the stay 6 of the valve housing: the left-hand end of the bellows 13 is connected to the abutment 15 through a connecting element 16 and a few pull rods 17 extending in the longitudinal direction of and closely surrounding the bellows. The right-hand end of the bellows 13 is connected to the displaceable sealing part 11 through a connecting element 18 and pull rods 19. The interior of the bellows 13 is connected through a line 20 to a pressure medium source.

In addition, the above-mentioned spring assemblies 14 are arranged between the displaceable sealing part 11 and the abutment 15 provided on the valve housing. They consist of a number of compression springs which tend to press the sealing element 12 carried by the displaceable sealing part 11 against the valve plate 7 (when it is inserted into the valve housing, see FIGS. 1 and 2) or against a co-operating surface on the valve housing (e.g. rail 9 or 9a).

In order to establish a seal between the displaceable sealing part 11 carrying the sealing element 12 and the abutment 15 integral with the housing, an elastically deformable membrane 21, preferably made of thin sheet steel, is provided between these two components.

Accordingly, the slide valve operates as follows:

When the valve plate 7 is in the open position (FIG. 3), the sealing element 12 is applied to the co-operating sealing surfaces (rails 9, 9a) under the effect of the spring assemblies 14. In this position, the supply of pressure medium to the bellows 13 is interrupted, so that the bellows 13 are relaxed (FIG. 2).

When the valve plate 7 is to be inserted into the pipeline, the bellows 13 are activated by the pressure medium. They move into the tensioned position (FIG. 1) in which the sealing element 12 is retracted. Once the valve plate 7 has been moved into the closed position, the supply of pressure medium to the bellows 13 is interrupted so that the sealing element 12 is applied to the valve plate 7 over its entire periphery.

It follows from the foregoing description that, in the event of any interruption in the supply of energy to the bellows 13, the sealing element 12 always moves into the sealing position under the effect of the tensioned spring assemblies 14, i.e. establishes the sealing contact (irrespective of whether the valve plate 7 is in the open position or the closed position). This precludes any danger of hot, possibly toxic gases escaping from the valve housing.

Another feature to be emphasized is the space-saving construction made possible by the bellows. Since the bellows can be arranged very close to the wall of the pipeline, the stays 5 may also be arranged fairly close to the axis of the pipeline, which is important on strength grounds for obtaining a light construction, particularly in the case of high-pressure pipelines (3 to 4 bars) and large-diameter pipelines (3 to 4 meters).

Figure 4:
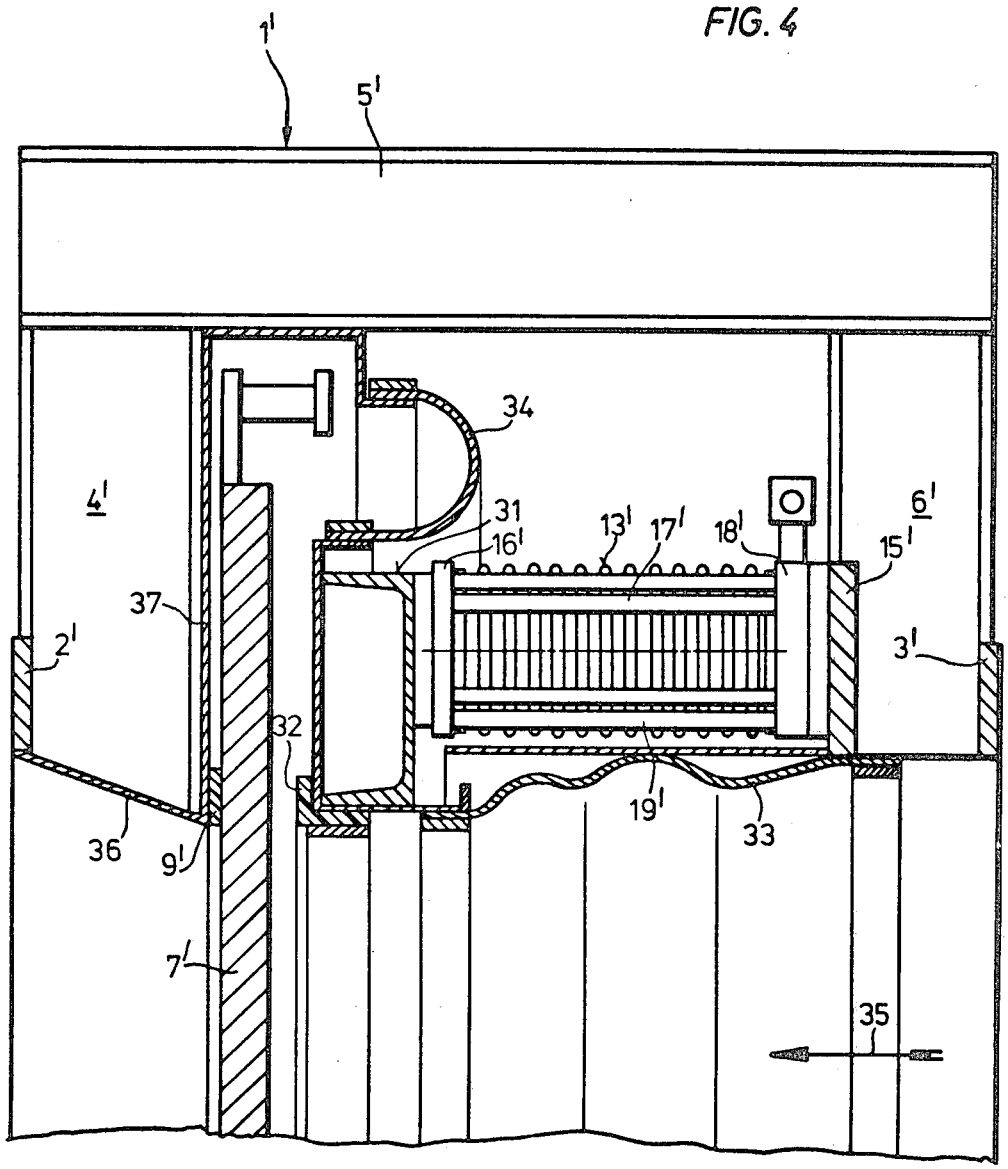
FIG. 4 is a section similar to FIG. 1 through a second embodiment of the slide valve.
Figure 5:
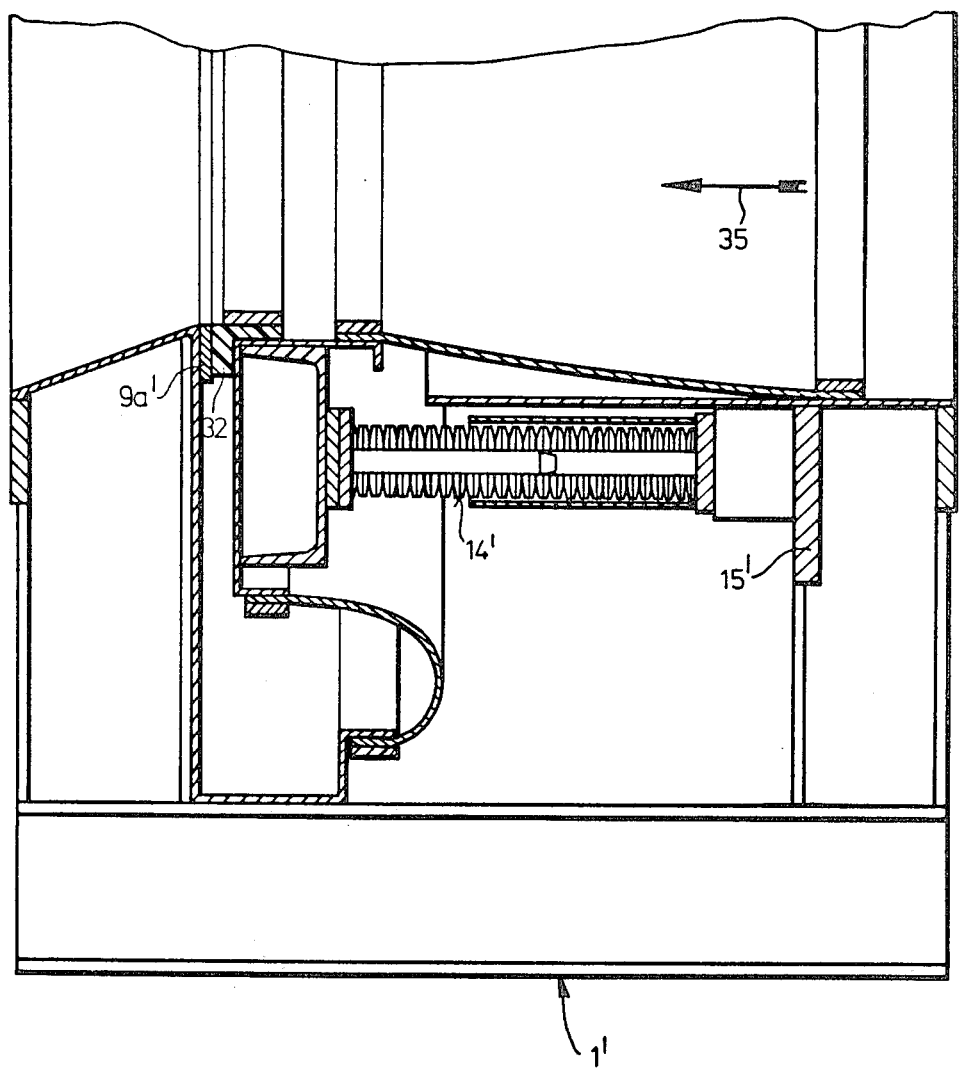
FIG. 5 is a section through the second embodiment of the slide valve in the region of a spring assembly (with the valve plate in the open position).

A second embodiment of a slide valve according to the invention is shown in FIGS. 4 and 5. In FIGS. 4 and 5, components structurally identical with those shown in FIGS. 1 to 3 are denoted by the same reference numerals plus an apostrophe, so that there is no need for these components to be described in detail again.

In this second embodiment, the slide valve 1' again comprises a valve housing consisting essentially of two pipe flanges 2', 3' and stays 4', 5' and 6' connecting them. The valve plate 7' of this embodiment may also be made in the same way and designed for horizontal displacement as in the embodiment illustrated in FIGS. 1 to 3.

In this case, a displaceable sealing part preferably in the form of a sealing frame 31 is provided in the valve housing, carrying a sealing element 32 which forms the sealing surface, and being arranged facing the valve plate 7' close to its periphery. Whereas, in the first embodiment, the sealing element 12 contains a kind of projecting bead, the sealing element 32 of this embodiment is formed by an angular profile seal which is fixedly arranged on the inner peripheral edge of the displaceable sealing frame 31 (directed towards a co-operating sealing surface 9' or 9a' of the housing). This design and arrangement of the sealing element 32 ensures that no gap facing towards the interior of the pipeline (in which solid crusts of material could form with the inevitable result of increasing leakages), remains present between the actual sealing surface of the sealing frame 31 and the co-operating surface (i.e. the co-operating surfaces 9', 9a' or the corresponding side of the valve plate 7').

In this case, too, the displaceable sealing frame 31 is operated by several bellows 13' uniformly distributed around the periphery (FIG. 4) on the one hand and, on the other hand, by several spring assemblies 14' which are also uniformly distributed around the periphery (FIG. 5), the bellows 13' and the spring assemblies 14' acting in the same way as in the embodiment illustrated in FIGS. 1 to 3. The bellows 13' are again connected to the displaceable sealing frame 31 on the one hand and to the fixed abutment 15' on the other hand in the manner already illustrated in FIGS. 1 to 3, i.e. through connecting elements 16' and 18' and through pull rods 17' and 19', respectively.

Whereas, in the embodiment shown in FIGS. 1 to 3, a membrane 21 preferably consisting of thin sheet steel is provided as an elastically deformable seal between the displaceable sealing part 11 and the abutment 15 integral with the housing, it is preferred in this second embodiment to provide between the abutment 15' integral with the housing and the sealing frame 31 an elastically deformable sealing membrane 33 of a soft, elastic sealing material (for example rubber or a rubber-like plastics material, optionally with re-inforcing inserts) which may also have a certain elongation elasticity in the longitudinal direction of the pipeline.

However, the particularly important aspect of this second embodiment is that a second sealing membrane 34 is arranged between the outer periphery of the displaceable sealing frame 31 and the inner periphery of the valve housing (which in this case is reinforced by the stay 5'). This second, outer sealing membrane 34 is preferably made of a soft, elastic sealing material in exactly the same way as the first, inner sealing membrane 33. As can also be seen from the two different extreme positions shown in FIGS. 4 and 5, the second outer sealing membrane 34 always provides in its various states of deformation for reliable sealing between the sealing region (sealing frame 31/valve plate 7') of the slide valve 1' and the outside of the valve housing. Another effect of this second outer sealing membrane 34 is that, in the event of leakage in or destruction of the first inner sealing membrane 33 and with the valve plate 7 in its closed sealing position, it prevents hot gas from passing from the high-pressure side situated in front of the valve plate 7', as seen in the direction of gas flow (arrow 35), to the low-pressure side of the slide valve 1' situated behind the valve plate 7'.

A comparison between the positions of the first sealing membrane 33 shown in FIGS. 4 and 5 also shows that, in the sealing position with the valve plate 7 open, the first sealing membrane 33 is stretched at least to the point where it is substantially taut whereas, in the open position of the sealing frame 31 (FIG. 4), it is slightly undulating in cross-section. Under the effect of these deformations of the first membrane 33, any crusts which may have formed automatically flake off. The second outer sealing membrane 34 has a similar effect.

FIGS. 4 and 5 also show that there is a reduced cross-section relative to the rated cross-sectional area of the pipeline in the region of the displaceable sealing frame 31 and the valve plate 7'. Looking at this embodiment, it can be seen that, in the direction of gas flow (arrow 35), the reduced cross-section is preceded by the first sealing membrane 33 tapering in cross-section and followed by a transition fitting 36 which widens to the rated cross-sectional area of the pipeline and which extends between the co-operating sealing surfaces 9', 9a' of the valve housing and the (in the drawing) left-hand pipe flange 2'.

So far as the construction of the valve housing itself is concerned, it is further pointed out that the above-mentioned co-operating sealing surfaces 9', 9a' of the housing are carried by the inner peripheral edge of an impervious intermediate wall 37 surrounding the reduction in cross-section.

Since it otherwise functions the same as the first embodiment, this second embodiment of the slide valve does of course additionally have all the advantages of the first embodiment.

I claim:

1. A slide valve for gas pipelines comprising an upstream and a downsteam pipeline section, said sections being spaced apart and rigidly connected by stays, a valve plate that is movable into a valve-closing position between said sections, and a floating annular sealing member connected to the upstream section by a flexible sleeve-like seal, wherein the improvement comprises a plurality of springs which are distributed around the annular sealing member and which act between the upstream section and the annular sealing member, and a plurality of pressure-medium actuated bellows which are distributed around the annular sealing member and are separate from the springs, each bellows having one end connected to the upstream section and having its other end more remote from the annular sealing member and connected to the annular sealing member by at least one pull-rod, both the valve plate and the downstream section having an annular seating surface for sealing engagement with the annular sealing member, and both the bellows and the springs having a stroke sufficient so that the bellows, when actuated by the pressure medium, move the annular sealing member clear of the valve plate, and so that when the valve plate is then removed from between the sections and the pressure in the bellows is relieved, the springs move the annular sealing member into sealing engagement with the annular seating surface on the downstream section.

2. A slide valve according to claim 1 wherein the valve plate is movable rectilinearly into a valve-closing position between the pipeline sections.

* * * * *